(12) United States Patent
Lee

(10) Patent No.: US 11,735,075 B2
(45) Date of Patent: Aug. 22, 2023

(54) SYSTEM FOR IMPLEMENTING AUTOMATIC DOOR USING TRANSPARENT DISPLAY

(71) Applicant: LG ELECTRONICS INC., Seoul (KR)

(72) Inventor: Taehyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/236,690

(22) Filed: Apr. 21, 2021

(65) Prior Publication Data
US 2022/0074254 A1 Mar. 10, 2022

(30) Foreign Application Priority Data
Sep. 8, 2020 (KR) .................. 10-2020-0114961

(51) Int. Cl.
*G09F 19/00* (2006.01)
*G09F 19/04* (2006.01)
*G09F 19/22* (2006.01)

(52) U.S. Cl.
CPC ............ *G09F 19/04* (2013.01); *G09F 19/227* (2021.05); *E05Y 2400/82* (2013.01); *E05Y 2400/856* (2013.01)

(58) Field of Classification Search
CPC ...... E05F 15/00; E05F 15/73; E05Y 2400/82; E05Y 2400/856; G06F 3/0412;
(Continued)

(56) References Cited

U.S. PATENT DOCUMENTS 6,079,162 A * 6/2000 Hein .................. E06B 3/50
49/6
8,169,317 B2 * 5/2012 Lemerand ............ E05F 15/70
340/521

(Continued)

FOREIGN PATENT DOCUMENTS

JP 2012067446 4/2012
JP 2017114412 6/2017
(Continued)

OTHER PUBLICATIONS

Korean Intellectual Property Office Application No. 10-2020-0114961, Office Action dated Feb. 22, 2022, 4 pages.
(Continued)

*Primary Examiner* — Chi Q Nguyen
(74) *Attorney, Agent, or Firm* — Lee, Hong, Degerman, Kang & Waimey PC

(57) ABSTRACT

Disclosed in this specification is a system for implementing an automatic door using a transparent display including an automatic door casing disposed around an entrance, a plurality of transparent display modules inserted into the automatic door casing or exposed to the outside to open and close the entrance, a sensor installed within a predetermined distance from the plurality of transparent display modules, wherein the sensor senses an object, a driver that controls at least one of the plurality of transparent display modules to be inserted into the automatic door casing or exposed to the outside based on a sensing result of the sensor, a door frame connected to the driver, wherein the door frame supports the plurality of transparent display modules, and a plurality of control boxes that respectively transmits different video data to the plurality of transparent display modules based on the sensing result of the sensor.

11 Claims, 20 Drawing Sheets

(58) Field of Classification Search
CPC ...... G06F 3/1431; G06F 19/04; G06F 3/1438; G09F 19/227; G09F 3/041; G09F 19/02
See application file for complete search history.

(56) References Cited

U.S. PATENT DOCUMENTS

| | | | |
|---|---|---|---|
| 8,225,458 B1 * | 7/2012 | Hoffberg | E05F 15/73 16/84 |
| 9,447,625 B1 * | 9/2016 | Seebaransingh | E05F 15/73 |
| 11,072,965 B2 * | 7/2021 | Soderqvist | E05F 1/006 |
| 11,339,604 B2 * | 5/2022 | Dreyer | E05F 15/43 |
| 11,536,075 B2 * | 12/2022 | Soderqvist | E05F 1/105 |
| 11,565,009 B2 * | 1/2023 | Kim | G06F 3/0416 |
| 2002/0066228 A1 * | 6/2002 | Janutta | E05D 15/12 49/409 |
| 2019/0376332 A1 * | 12/2019 | Chi-Hsueh | G07C 9/00563 |
| 2020/0165859 A1 * | 5/2020 | Hong | E05F 15/73 |
| 2022/0136305 A1 * | 5/2022 | Elwine | E05B 65/0035 49/334 |
| 2022/0327971 A1 * | 10/2022 | Mier-Hicks | G09F 27/005 |

FOREIGN PATENT DOCUMENTS

| | | |
|---|---|---|
| KR | 1020120044874 | 5/2012 |
| KR | 1020160145310 | 12/2016 |

OTHER PUBLICATIONS

Korean Intellectual Property Office Application No. 10-2020-0114961, Office Action dated Aug. 4, 2022, 3 pages.

* cited by examiner

SYSTEM FOR IMPLEMENTING AUTOMATIC DOOR USING TRANSPARENT DISPLAY

Pursuant to 35 U.S.C. § 119(a), this application claims the benefit of earlier filing date and right of priority to Korean Patent Application No. 10-2020-0114961, filed on Sep. 8, 2020, the contents of which is hereby incorporated by reference herein in its entirety.

BACKGROUND

Field

The present disclosure is applicable to a technical field related to a display device, and relates to, for example, an automatic door system using a transparent display and a method for controlling the same.

Discussion of the Related Art

With recent development of an image technology and a transparent electronic element development technology, a transparent display panel capable of displaying while an object behind is visible is being actively researched. An electronic device displays an image and data using a transparent display panel as a display panel. As such a transparent display panel, for example, an organic light emitting panel, a plasma panel, or the like using self-luminescence is widely used.

The transparent display panel displays image information while at the same time, the object behind is visible through the transparent panel, so that various services using this are required.

In one example, in recent years, various buildings such as a bank, an apartment, a hospital, and the like have many automatic doors installed for customer convenience and store value. Such automatic doors are manufactured and used in a sliding door type of opening and closing while moving in a left and right direction and a casement type of opening and closing in a pivoting form.

In this regard, according to the prior art, in order to effectively utilize a space and increase an advertising effect, printed paper is attached to an entrance door or an advertising copy or design, lighting, or the like is installed to give an aesthetic sense to people entering and exiting and improving visibility, thereby increasing the advertising effect.

However, there were problems that additional work is required to attach the printed paper and other advertisements to the automatic door, and management is not easy even after the attachment, for example, an attached portion is detached because of an operation of the automatic door and the like. Furthermore, there was a problem that it is not easy to replace the advertisement once attached to the automatic door from time to time.

In addition, in the case of the sliding door-type automatic door, because the entire automatic door slides in the left and right direction, there was a concern that the printed paper or the advertisement attached to the automatic door may be pushed. In particular, it was technically very difficult to supply power to the lighting installed on the automatic door.

SUMMARY

A purpose of an embodiment of the present disclosure is to solve the above-described problems and provide an automatic door system implemented using a transparent display module.

Another purpose of an embodiment of the present disclosure is to provide an automatic door structure that may stably support the transparent display module.

Another purpose of an embodiment of the present disclosure is to provide various method for controlling the automatic door system using the transparent display module.

Furthermore, another purpose of an embodiment of the present disclosure is to solve various problems not mentioned here. Those skilled in the art may understand this through the gist of an entirety of the specification and the drawings.

In an aspect of the present disclosure, a system for implementing an automatic door using a transparent display including an automatic door casing disposed around an entrance, a plurality of transparent display modules inserted into the automatic door casing or exposed to the outside to open and close the entrance, a sensor installed within a predetermined distance from the plurality of transparent display modules, wherein the sensor senses an object, a driver that controls at least one of the plurality of transparent display modules to be inserted into the automatic door casing or exposed to the outside based on a sensing result of the sensor, a door frame connected to the driver, wherein the door frame supports the plurality of transparent display modules, and a plurality of control boxes that respectively transmits different video data to the plurality of transparent display modules based on the sensing result of the sensor.

In one implementation, the automatic door casing may include an upper casing formed across a top face of the entrance, a first side casing formed along a wall face at one side of the entrance, and a second side casing formed along the wall face at the other side of the entrance, and the first side casing and the second side casing may be made of an opaque material.

In one implementation, the plurality of transparent display modules may include a first transparent display module inserted into the first side casing or exposed to the outside, and a second transparent display module inserted into the second side casing or exposed to the outside, and the first transparent display module and the second transparent display module may come into with each other to close the entrance.

In one implementation, the first transparent display module and the second transparent display module may further include a shock mitigating member disposed at a portion where the first transparent display module and the second transparent display module are in contact with each other.

In one implementation, each of the first transparent display module and the second transparent display module may include two transparent display panels vertically connected to each other, and the door frame may further include an auxiliary frame disposed between the two transparent display panels to support the two transparent display panels.

In one implementation, the sensor may be attached to the upper casing, and the sensor may sense an object in a predetermined region in front of a front face of the transparent display module and transmit a sensing signal to the driver.

In one implementation, the plurality of control boxes may transmit first video data to the plurality of transparent display modules in a state where the entrance is closed by the plurality of transparent display modules, transmit second video data to the plurality of transparent display modules when the object is sensed by the sensor, and block the video data transmission in a state where all of the plurality of transparent display modules are inserted into the automatic door casing.

In one implementation, the driver may control the plurality of transparent display modules to close the entrance when a predetermined time elapses after all of the plurality of transparent display modules are inserted into the automatic door casing, and the plurality of control boxes may transmit third video data to the plurality of transparent display modules while the plurality of transparent display modules close the entrance.

In one implementation, the system may further include a first maintenance door disposed on a face of a portion of the first side casing, and a second maintenance door disposed on a face of a portion of the second side casing, and the first maintenance door and the second maintenance door may be opened and closed, so that a user is able to access an interior of the side casing.

In one implementation, the driver may stop driving of the first transparent display module and video data output of the first transparent display module may be stopped when the first maintenance door is open.

In one implementation, the plurality of transparent display modules may divide entire image information into first image information and second image information and output the first image information and the second image information, the first transparent display module may output the first image information and the second transparent display module may output the second image information when all the maintenance doors are closed, the first transparent display module may stop outputting the first image information and the second transparent display module may output the second image information until a predetermined time elapses after the first maintenance door is opened, and the second transparent display module may output the entire image information when the predetermined time elapses after the first maintenance door is opened.

In one implementation, the system may further include a tempered glass attached to at least a portion of a front face or a rear face of the transparent display module, and a thickness of the tempered glass may be equal to or less than 3 mm.

In one implementation, the plurality of transparent display modules may further include a touch panel that receives a touch input from a user, and the driver may control the at least one of the plurality of transparent display modules to be inserted into the automatic door casing when the touch input through the touch panel from the user is sensed.

According to an embodiment of the present disclosure, the automatic door system may be implemented using the transparent display.

Specifically, depending on whether the object around the automatic door is sensed, the plurality of transparent display modules may be inserted into the automatic door casing or exposed to the outside to open or close the entrance.

According to another embodiment of the present disclosure, the plurality of thin transparent displays are stably supported, thereby implementing an automatic door system with high operation reliability.

Furthermore, according to another embodiment of the present disclosure, there is a technical effect of presenting a solution for reproducing perfect video data even when a failure occurs in some of the plurality of transparent displays.

In addition, according to another embodiment of the present disclosure, various video data may be displayed on the transparent display based on the operation of the automatic door to attract attention of a surrounding user, and an interior of a space where the automatic door is installed may be viewed through the transparent display, thereby providing a different consumer experience.

Furthermore, according to another embodiment of the present disclosure, the automatic door system may be easily maintained through the maintenance door disposed in the automatic door casing.

DESCRIPTION OF SPECIFIC EMBODIMENTS

Figure 1:
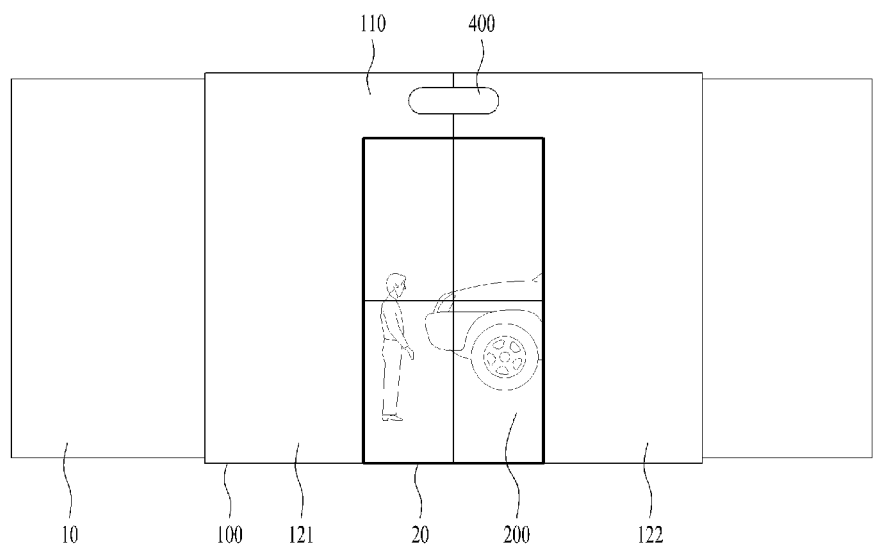
FIG. 1 is a perspective view of an automatic door system implemented using a transparent display according to an embodiment of the present disclosure.

Hereinafter, exemplary embodiments disclosed herein will be described in detail with reference to the accompanying drawings. Regardless of reference numerals, the same or similar components are assigned the same reference numerals, and redundant descriptions thereof will be omitted. The suffixes "module" and "unit" for components to be used in the following description are given or used interchangeably in consideration of only the ease of writing of the specification, and do not have distinct meanings or roles by themselves. In addition, in describing the embodiments disclosed in this specification, when it is determined that a detailed description of a related known technology may obscure the gist of the embodiments disclosed herein, the detailed description thereof will be omitted. In addition, it should be noted that the accompanying drawings are only for easy understanding of the embodiments disclosed in this specification, and the technical spirit disclosed in this specification should not be interpreted as being limited by the accompanying drawings.

Furthermore, although each drawing is described for convenience of description, it is also within the scope of the present disclosure for those skilled in the art to implement another embodiment by combining at least two drawings.

In addition, when a component such as a layer, a region, or a substrate is referred to as being "on" another component, it will be understood that the component may be directly on another component or there may be intermediate elements therebetween.

A display device described herein is a concept including all display devices that display information in a unit pixel or a set of unit pixels. Therefore, the display device may be applied to parts, not limited to finished products. For example, a panel corresponding to a part of a digital TV independently corresponds to the display device in this specification. As the finished products, a mobile phone, a smart phone, a laptop computer, a terminal for digital broadcasting, a personal digital assistant (PDA), a portable multimedia player (PMP), a navigation, a slate PC, a tablet PC, an Ultra Book, the digital TV, a desktop computer. and the like may be included.

However, it will be readily apparent to those skilled in the art that a configuration according to an embodiment described in the present specification may be applied to a device capable of display even in a form of a new product to be developed in the future.

In addition, a semiconductor light emitting element mentioned in this specification is a concept including an LED, a micro LED, and the like, which may be used interchangeably.

In addition, terms such as "first", "second", and the like may be used to describe various components, but the components may not be limited by the terms. These terms are only for the purpose of distinguishing one component from another component.

FIG. 1 is a perspective view of an automatic door system implemented using a transparent display according to an embodiment of the present disclosure.

As shown in FIG. 1, a system implementing an automatic door using a transparent display may display information while maintaining a transparent state through the transparent display. Accordingly, various information may be provided without disturbing vision of people.

In addition, the automatic door system implemented using the transparent display according to an embodiment of the present disclosure may wirelessly transmit the display information to portable terminals (the mobile phones, the PDAs, and the like) carried by the people.

The system that implements the automatic door using the transparent display may be installed along a portion of a wall face 10. The system includes an automatic door casing 100 disposed around an entrance 20, a plurality of transparent display modules 200 that are inserted into the automatic door casing 100 or exposed to the outside to open and close the entrance 20, a sensor 400 that is installed within a predetermined distance from the plurality of transparent display modules 200 and detects an object, a driver (not shown) that controls at least one of the plurality of transparent display modules 200 to be inserted into the automatic door casing 100 or exposed to the outside based on the sensing result of the sensor 400, a door frame (not shown) that is connected to the driver and supports the plurality of transparent display modules 200, and a plurality of control boxes that respectively transmits different video data to the plurality of transparent display modules 200 based on the sensing result of the sensor 400.

Referring to FIG. 1, the system implementing the automatic door using the transparent display according to the present disclosure may include the transparent display modules.

The transparent display module 200 has a characteristic of transmitting light while displaying a predetermined image on a screen. Accordingly, a user may visually perceive an object located on an opposite side around the transparent display module 200.

For example, the user located on one side around the transparent display module 200 may watch the image displayed on the transparent display module 200, or may visually perceive another user or other objects located on the opposite side around the transparent display module 200.

Such a transparent display module may include, for example, an inorganic thin film electroluminescent display, an organic light emitting diode (OLED), and the like.

They may be driven in a passive matrix scheme, and may have sufficiently high light transmittance because there is no need for a TFT. Accordingly, they may be used as the transparent display module.

Alternatively, like an active matrix OLED, even when using the TFT, when the TFT is manufactured using a transparent material such as a poly-oxide semiconductor, the light transmittance may be sufficiently increased.

The transparent display module according to the present disclosure, which is, for example, an intelligent image display device into which a computer support function is added to a broadcasting reception function, is able to have an interface that is more convenient to use, such as an input device in a handwritten scheme, a touch screen, a space remote controller, or the like, as an Internet function is added while being faithful to the broadcast reception function.

In addition, the transparent display module according to the present disclosure may access the Internet and a computer with support of wired or wireless Internet functions, and perform functions such as an e-mail, web browsing, banking, a game, or the like. A standardized general-purpose OS may be used for such various functions.

As shown in FIG. 1, the transparent display module 200 may be disposed in the automatic door casing 100. The transparent display module 200 may be inserted into the automatic door casing 100 or exposed to the outside to open or close the entrance 20.

In an embodiment, the plurality of transparent display modules 200 may be arranged.

As shown in FIG. 1, at least two transparent display modules 200 may be arranged, and may be respectively exposed out of the automatic door casing 100 from both sides of the entrance 20 to open and close the entrance 20. In one example, four transparent display modules 200 may be implemented on top/bottom/left/right portions of the entrance 20.

The transparent display module 200 arranges a light emitting source on a transparent panel and supplies power using an ultra-fine processed conductive wire that is difficult to recognize with the naked eye. Thus, the power may be applied to the light emitting source that expresses a pattern or the like in a shape of a plane and a line, so that the pattern or information floating in the air is specifically expressed as the plane, the line, and a dot, not a combination of the dots. Therefore, the transparent display module 200 may perform advertising during normal times, perform customer reception such as greetings, promote seasonal events, or the like through the light emitting source.

In addition, because the transparent display module 200 is transparent, even when an image is output from the light emitting source, a user located in front of the transparent display module 200 may visually identify various objects located behind the transparent display module 200.

It is common for various large display devices including the transparent display to be fixedly installed in a specific region. Like the present disclosure, in order to use the display device including the transparent display module as the automatic door, the transparent display module 200 should be moved frequently. Thus, a structure that may stably support the display module is required unlike installation of a general display device.

Accordingly, in an embodiment of the present disclosure, the transparent display module 200 may be supported by the automatic door casing 100 and driven to be inserted into the automatic door casing 100 or exposed to the outside.

In an embodiment, as shown in FIG. 1, the automatic door casing 100 may be formed to surround edges of the entrance 20.

The entrance 20 may be formed in various shapes. In the following description, for convenience of description, it is assumed that entrance 20 is a rectangular passage.

The automatic door casing 100 may be disposed around the entrance 20 with a passage having an area equal to or larger than an area of the entrance 20 so as not to cover the entrance 20.

In an embodiment, the automatic door casing 100 may be constructed by being attached to the wall face 10 around the entrance 20.

The automatic door casing 100 may form an appearance of the system for implementing the automatic door using the transparent display according to the present disclosure, and may mount various transparent display modules 200 and other components therein.

In an embodiment, the automatic door casing 100 may include an upper casing 110 formed across a top face of the entrance 20, a first side casing 121 formed along the wall face 10 at one side of the entrance 20, and a second side casing 122 formed along the wall face 10 at the other side of the entrance 20.

In addition, the automatic door casing 100 may further include a lower casing formed on a bottom face of the entrance 20 and having both ends respectively connected to the first side casing 121 and the second side casing 122. The lower casing may guide the movement of the transparent display module 200 together with the upper casing 110.

A distance between the first side casing 121 and the second side casing 122 may be equal to or wider than a width of the entrance 20. Therefore, when the transparent display modules 200 are completely inserted into the both side casings, the user may enter and exit the entrance 20 without being disturbed by the both side casings.

In an embodiment, the upper casing 110 and the first and second side casings may be constructed to be connected to each other, and may be made of the same material.

Unlike a general transparent glass automatic door, the transparent display module 200 requires a control box or a cable that supplies an electrical signal and power to the transparent display panel to output a video image.

In an embodiment, the automatic door casing 100 may be made of an opaque material. In particular, at least one of the first side casing 121 and the second side casing 122 may be made of the opaque material.

Therefore, when being inserted into the automatic door casing 100, the transparent display modules 200 may be completely covered by the both side casings and not be visible. In addition, because the control box and the cable may be installed inside the both opaque side casings, an automatic door system that is structurally concise and has a clean appearance may be constructed.

Figure 2:
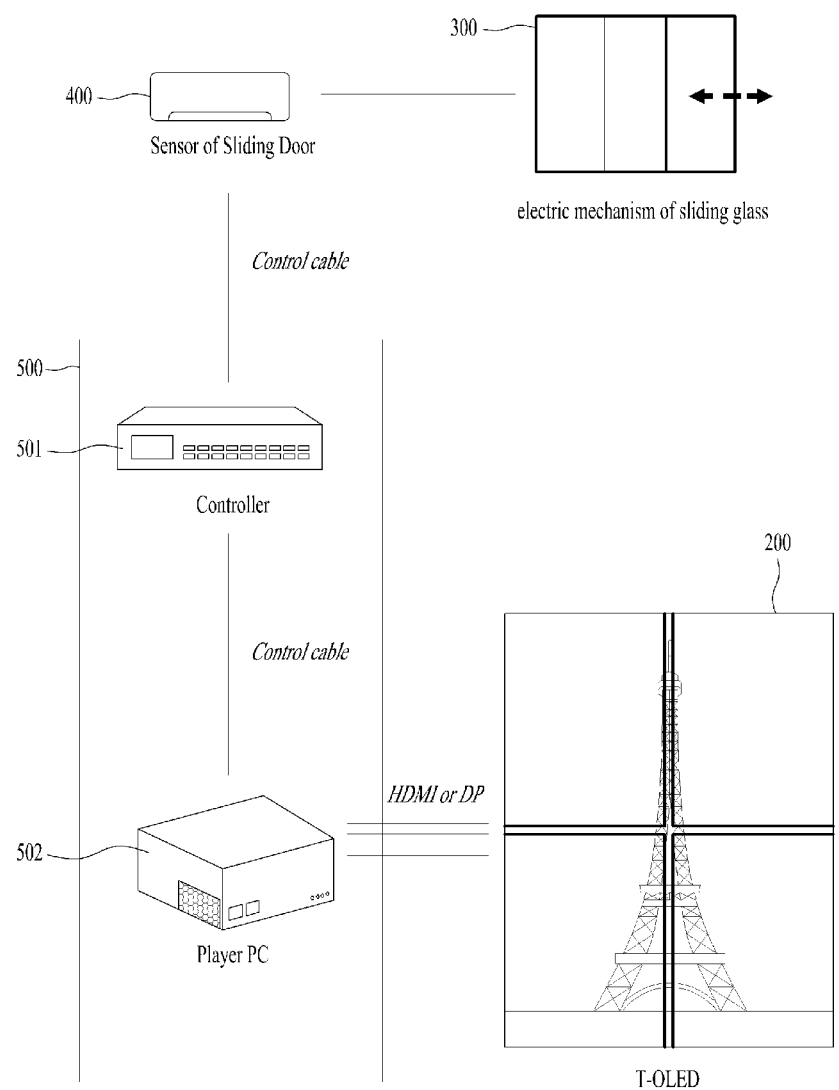
FIG. 2 is a block diagram illustrating a configuration of an automatic door system of FIG. 1.

FIG. 2 is a block diagram illustrating a configuration of an automatic door system of FIG. 1.

As shown in FIG. 2, the system according to the present disclosure may include the plurality of transparent display modules 200, a driver 300 that controls the driving of the transparent display modules 200, a sensor 400 that transmits a sensing signal to the driver 300, and a control box 500 that controls the output of the transparent display modules 200.

The sensor 400 is installed within a predetermined distance from the plurality of transparent display modules 200, detects the object, and transmits the sensing signal to the driver 300 and the control box 500.

The driver 300 receives the sensing signal from the sensor 400 and drives the transparent display module 200. In an embodiment, the transparent display modules 200 may slide in a reciprocating manner along the automatic door casing 100 to open and close the entrance 20, and the driver 300 may implement the sliding driving of the transparent display modules 200 in response to the sensing signal. Specifically, the sliding driving may be implemented through, for example, a motor, a roller, a rail, and the like.

The control box 500 may receive the sensing signal and transmit a video signal to the plurality of transparent display modules 200.

The control box 500 may include a controller 501 that processes the sensing signal and a control signal, and a signal processor 502 that transmits video data to the plurality of transparent display modules 200. The signal processor 502 may include software capable of outputting an overall unified image by linking individual screens of the plurality of transparent display modules 200 with each other.

For the transmission of the video data, an HDMI or display port (DP) connector and cable 503 may be utilized, and various data transmission standards other than the above standard may be applied.

The plurality of display modules may receive the video data from the control box 500 and output the video images on the individual display screens.

The plurality of display modules may output different video images respectively on the display screens, and may output the video image in a full screen mode by linking the display screens with each other.

When necessary, the present disclosure is designed to have the same number of control boxes 500 as the number of display modules arranged to control the plurality of display modules.

Figure 3:
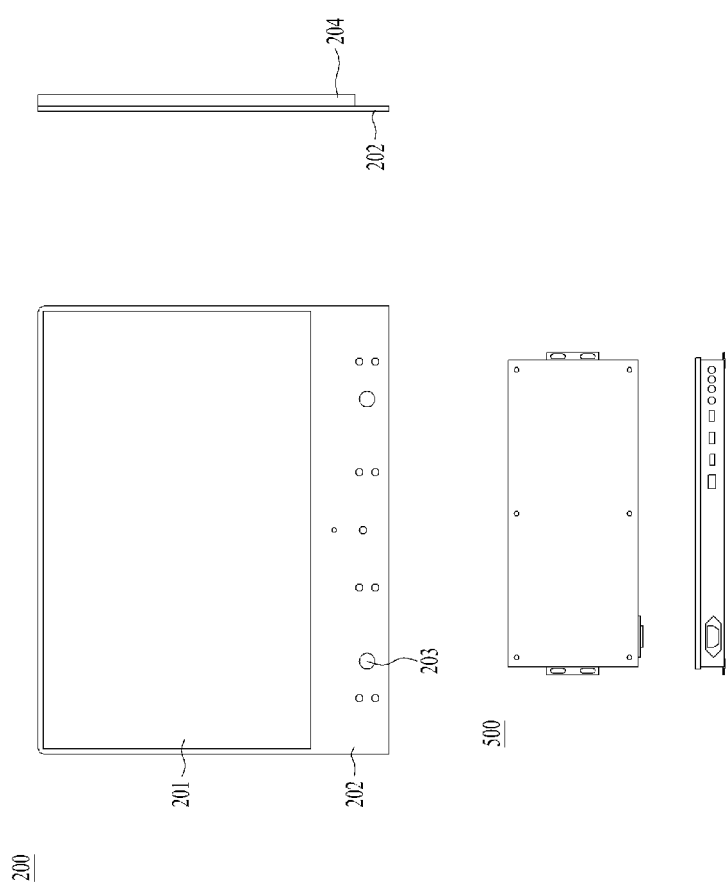
FIG. 3 illustrates a front view and a side view of a display module disposed in an automatic door system implemented using a transparent display according to an embodiment of the present disclosure.

FIG. 3 illustrates a front view and a side view of a display module disposed in an automatic door system implemented using a transparent display according to an embodiment of the present disclosure.

The display panel may include a panel 201 on which the video data is output and a bezel 202 formed to surround the panel 201 and supporting the panel 201.

The bezel 202 may further include a coupling hole 203 defined in a face of a portion of the bezel 202 to fix the display panel to the door frame.

In an embodiment, a tempered glass 204 that protects the display panel may be attached to a front face or a rear face of the display panel included in the transparent display module 200. The tempered glass may have an area larger than an area of the display panel and equal to or smaller than a total area of the transparent display module 200.

In an embodiment, the transparent display module 200 may further include the tempered glass 204 attached to a front face or a rear face of the transparent display module 200. It is efficient to design a thickness of the tempered glass 204 to be, for example, equal to or less than 3 mm.

As shown in FIG. 3, the control box 500 of the system according to the present disclosure may be formed in a form of an integrated control box including the controller and the signal processor. The control box may have various input/output ports including the HDMI or the DP on a rear face thereof.

Figure 4:
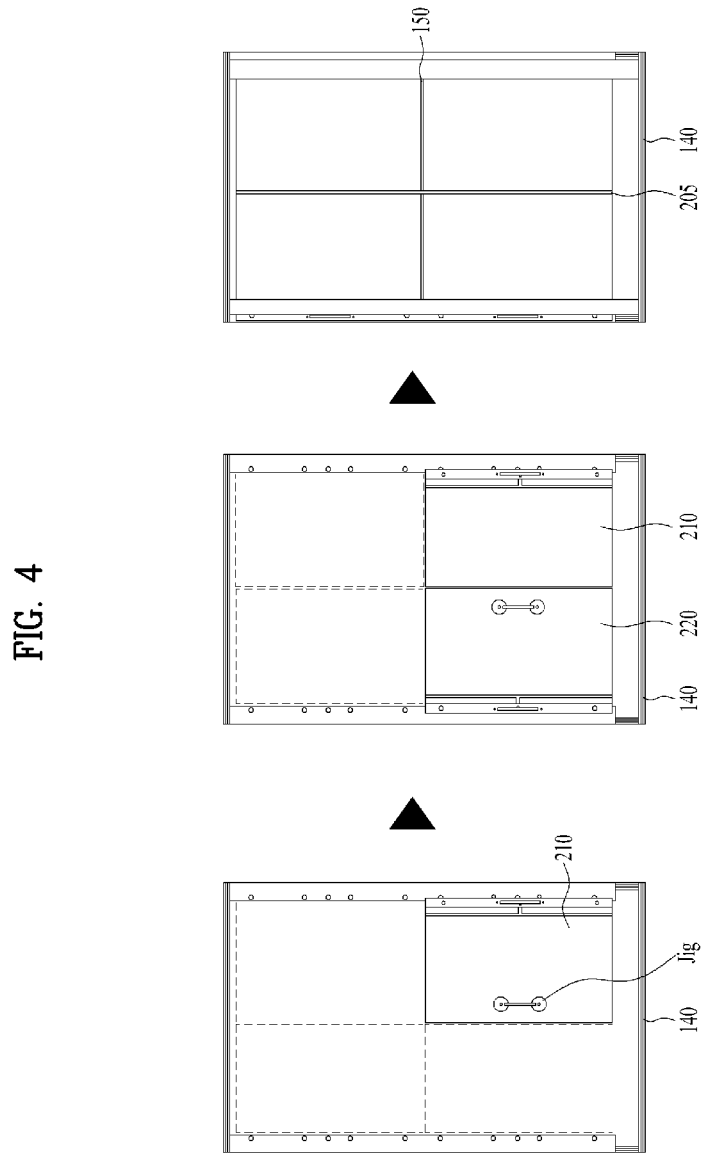
FIG. 4 is a conceptual diagram illustrating fastening of transparent display modules.

FIG. 4 is a conceptual diagram illustrating fastening of transparent display modules. Referring to FIG. 4, a process of fastening the plurality of transparent display modules to the door frame 140 will be described.

FIG. 4 shows four transparent display modules, but the scope of the present disclosure is not necessarily limited thereto.

The plurality of transparent display modules according to the present disclosure act as the automatic door capable of opening and closing the entrance in the automatic door system.

The plurality of transparent display modules may include both of a first transparent display module 210 inserted into the first side casing or exposed outward, and a second transparent display module 220 inserted into the second side casing or exposed to the outside.

As shown, each of the first transparent display module 210 and the second transparent display module 220 may include two transparent display panels connected with each other vertically.

That is, the first transparent display module 210 may be composed of a first upper transparent display module and a first lower transparent display module that are connected to each other vertically. Likewise, the second transparent display module 220 may also be composed of a second upper transparent display module and a second lower display module connected to each other vertically.

Hereinafter, a method for fastening the display modules with each other will be described.

For convenience of transporting and assembling the transparent display modules, a jig may be used. First, the first lower transparent display module is coupled to the door frame 140. The coupling may be screw coupling through the coupling hole 203 defined in the bezel 202 of the transparent display module.

After the first lower transparent display module is coupled, the second lower transparent display module is coupled to a portion of the door frame 140 opposite to a portion to which the first lower transparent display module. Thereafter, the first upper transparent display module and the second upper transparent display module are sequentially coupled to complete a combination of the plurality of transparent display modules.

In an embodiment, the first transparent display module 210 and the second transparent display module 220 may come into contact with each other to close the entrance.

Unlike the general glass door, the plurality of transparent display modules may be easily damaged by repeated impacts. To prevent this, the first transparent display module 210 and the second transparent display module 220 may further include a shock mitigating member 205 at a portion at which the first transparent display module 210 and the second transparent display module 220 are in contact with each other.

As described above, the first transparent display module 210 may be composed of the first upper transparent display module and the first lower transparent display module vertically connected to each other. In order to support the two transparent display modules vertically connected to each other, the present disclosure is designed to place an additional structure on the door frame 140.

In an embodiment, the door frame 140 may further include an auxiliary frame 150 disposed between the two transparent display panels to support the two transparent displays.

The auxiliary frame 150 may be coupled to one edge of the transparent display to support the transparent display.

The auxiliary frame 150 may be made of the same material as the door frame 140.

In addition, the auxiliary frame 150 may be made of a transparent material to transmit the video images output on the plurality of transparent display modules 200 without distortion.

Figure 5:
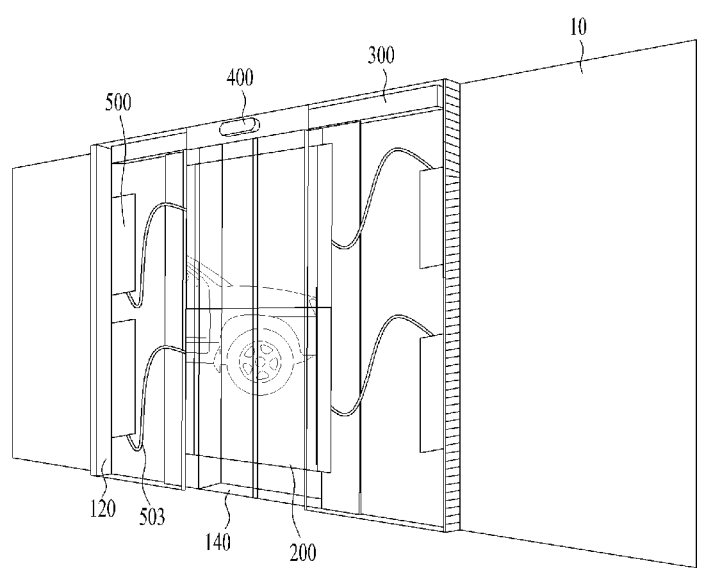
FIG. 5 is a perspective view illustrating an internal configuration of an automatic door casing according to an embodiment of the present disclosure.

FIG. 5 is a perspective view illustrating an internal configuration of the automatic door casing 100 according to an embodiment of the present disclosure.

The automatic door casing may be installed around the entrance along the wall face 10. Among the automatic door casings, the both side casings may have a space defined therein in which the plurality of display modules may be inserted, and accordingly, may open and close the entrance as the plurality of display modules are inserted into the side casings or exposed to the outside.

The driver 300 that controls the driving of the plurality of display modules may be disposed at a top of the side casing. The driver 300 may include a driving rail formed parallel to the wall face 10 along a top face of the side casing. The plurality of transparent displays may be driven by sliding inside the side casing along the driving rail.

The sensor 400 may be attached to the upper casing 110, and may sense an object in a predetermined region in front of the front face of the transparent display module 200 and transmit the sensing signal to the driver 300. The predetermined region may correspond to a sensing range of the sensor 400 and may be variably set by the user to have an appropriate area.

The sensor 400 may also transmit the sensing signal to the control box 500. Accordingly, the control box 500 may transmit the video data to the plurality of transparent display modules 200 in response to the sensing signal.

The control box 500 may be mounted inside the side casing. The control box 500 may be fixedly attached to an edge of the side casing so as not to interfere with driving of the plurality of transparent displays. The present disclosure may be designed such that the plurality of control boxes 500 may be arranged to correspond to the plurality of transparent display modules 200.

The control box 500 and the plurality of transparent displays are communicatively or electrically connected to each other through a plurality of cables 503 to exchange the video data. The plurality of cables 503 may include a power cable and a data transmission cable. That is, the power cable and the data transmission cable may be a set of cables formed as a bundle. Accordingly, the plurality of cables 503 may be a plurality of cable sets.

One end of the cable 503 may be connected to a portion of the transparent display module 200, and the other end thereof may be connected to the control box 500. Accordingly, the cable 503 may match the display module 200 and the control box 500 one-to-one.

Figure 6A:
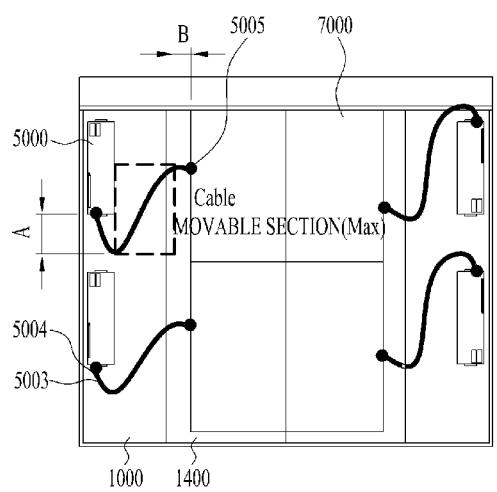
FIGS. 6a and 6b are diagrams for illustrating installation of a cable in an automatic door system according to an embodiment of the present disclosure.
Figure 6B:
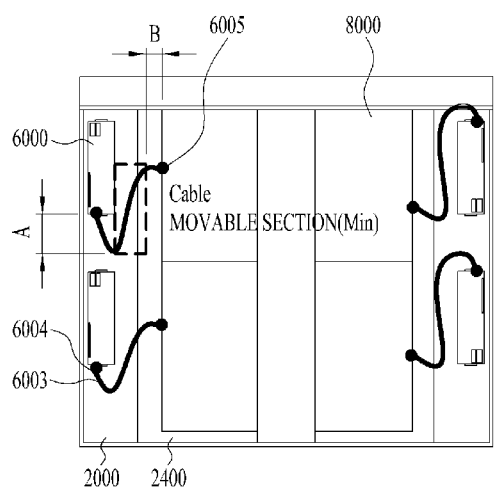

Because the display module 200 has to be driven frequently to open and close the entrance, the cable 503 connected to the display module 200 also continuously moves. Therefore, to secure driving reliability of the cable 503, it is required to design an appropriate cable installation location. A solution for solving this will be described later with reference to FIGS. 6*a* and 6*b*. FIGS. 6*a* and 6*b* are diagrams for illustrating installation of a cable in an automatic door system according to an embodiment of the present disclosure.

As shown in FIG. 6*a*, a cable 5003 may connect one transparent display module 7000 and one control box 5000 with each other. Because this is according to an embodiment, the cable 5003 may connect a plurality of transparent display modules 7000 and a plurality of control boxes 5000 with each other at the same time.

According to an embodiment, one end of the cable 5003 is connected to a cable port 5004 disposed at one end of the control box 5000, and the other end thereof is connected to a cable port 5005 disposed on the transparent display module.

According to an embodiment, in order to prevent the cable 5003 from randomly moving in the automatic door casing, a portion of the cable 5003 may be fixed at a predetermined location in the automatic door casing.

The predetermined location may be set to be spaced apart from each of the control box 5000 and the transparent display module 7000 by a predetermined distance.

As shown in FIG. 6*a*, the cable 5003 may be fixed to the automatic door casing at a point spaced apart by A from the cable port 5004 of the control box 5000. In addition, the cable 5003 may be fixed to the automatic door casing at a point spaced apart by B from the cable port 5005 of the transparent display module 7000.

As a result of the experiment, when the control box 5000 is formed into a hexahedron having a width of 754 mm, a length of 238 mm, and a height of 34 mm, for smooth movement of the above-described cable 5003, it is preferable that A is equal to or less than 100 mm.

As a result of another experiment, when the transparent display module 7000 is formed into a thin plate-shaped hexahedron having a width of 1225 mm, a length of 810 mm, and a thickness of 13.5 mm, for smooth movement of the above-described cable 5003, it is preferable that B is equal to or less than 80 mm.

For convenience of description, the point spaced apart by A from the control box 5000 will hereinafter be referred to as a point A, and a point spaced apart by B from the transparent display module 7000 will hereinafter be referred to as a point B.

At least portions of the cable may be fixed to the point A and the point B, respectively.

Accordingly, the cable 5003 may move only within a uniform movable section set by the point A and the point B. Therefore, there is a technical effect that the cable 5003 does not move indiscriminately within the automatic door casing, but is able to move stably and predictably only within a target region.

As shown in FIG. 6*a*, in a state in which the transparent display module 7000 closes the entrance, a movable maximum section of the cable 5003 is determined by the point A and the point B. Accordingly, the user of the automatic door system may design the automatic door without disposing unnecessary structures at a point at which the cable 5003 is able to move, thereby implementing a system having a stable structure.

In one example, as shown in FIG. 6*b*, in a state in which a transparent display module 8000 opens the entrance, a movable minimum section of a cable 6003 is determined by the point A and the point B. Accordingly, the user of the automatic door system may predict a situation in which the cable 6003 moves in a most compressed state, and reflect such situation in a design, thereby realizing the automatic door system with high reliability.

In an embodiment, a cable rail may be further disposed such that the cable 6003 may stably move in the movable section.

The cable rail is disposed in the cable movement region inside the automatic door casing to move the cable 6003 along a predetermined path.

Figure 7A:
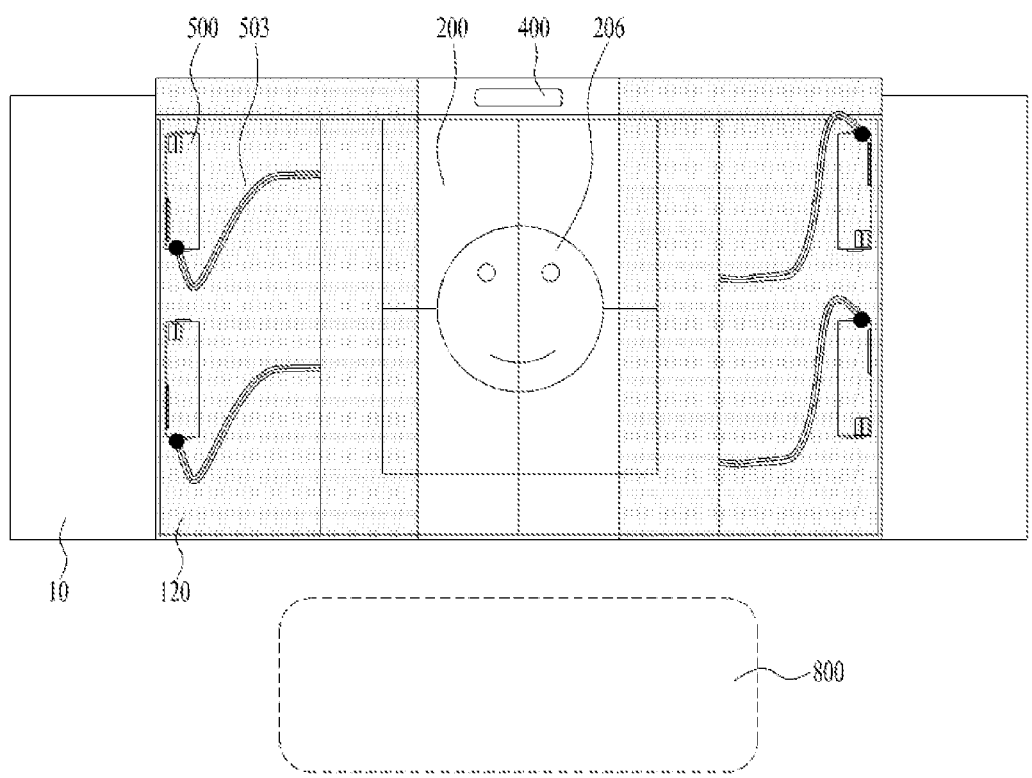
FIGS. 7a to 7c are conceptual diagrams illustrating driving of an automatic door implemented using a transparent display according to an embodiment of the present disclosure.
Figure 7B:
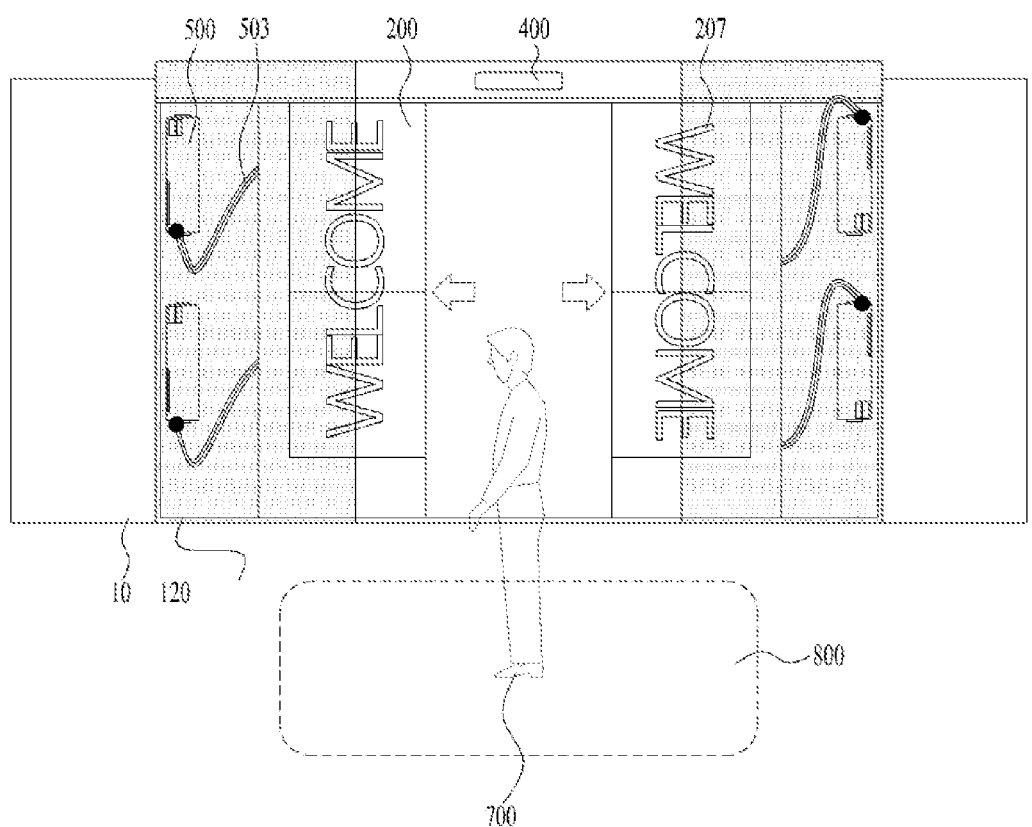
Figure 7C:
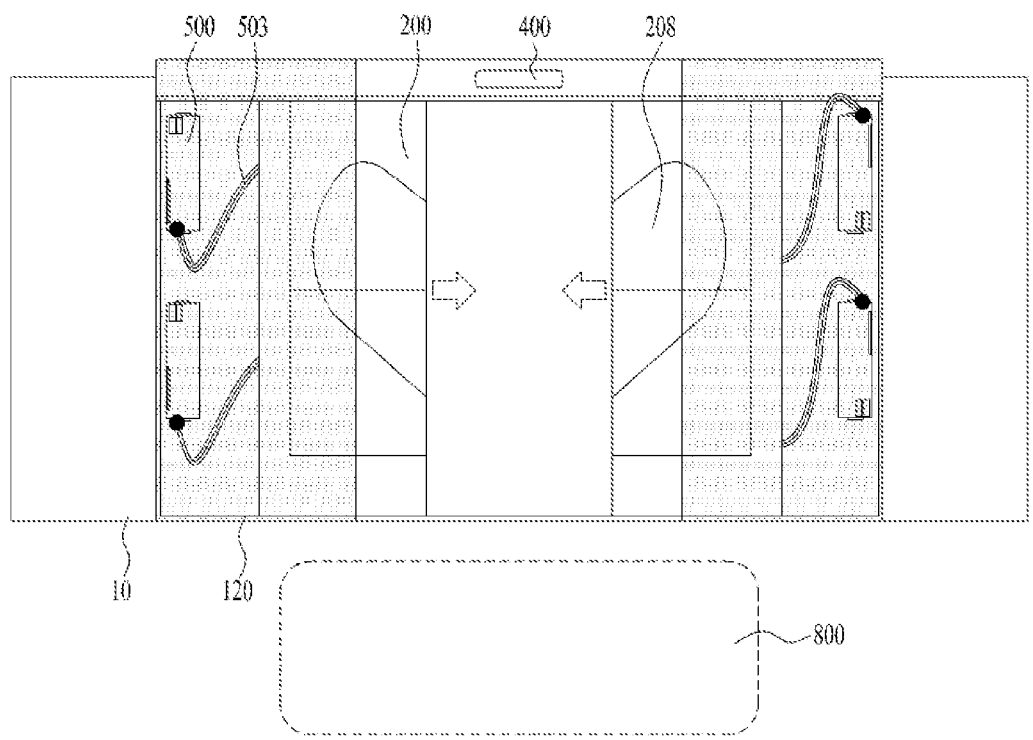

FIGS. 7*a* to 7*c* are conceptual diagrams illustrating driving of an automatic door implemented using a transparent display according to an embodiment of the present disclosure.

In an embodiment, in the state in which the entrance is closed by the plurality of transparent display modules 200, the plurality of control boxes 500 may transmit first video data to the plurality of transparent display modules 200, transmit second video data to the plurality of transparent display modules 200 when the object is sensed by the sensor 400, and block the transmission of the video data in a state in which the plurality of transparent display modules 200 are all inserted into the automatic door casing 100. Accordingly, there is a technical effect of preventing unnecessary power consumption and video data processing.

As shown in FIG. 7*a*, when there is no object in a predetermined region 800, the automatic door system according to the present disclosure may close the entrance and output predetermined first video data 206 on the transparent display modules 200. The first video data 206 may be output as the control box 500 transmit the first video to the transparent display modules 200.

The first video data 206 may be output in the full screen mode as all of the transparent display modules are linked to each other, and each individual transparent display module may output a separate image.

As shown in FIG. 7*a*, when the object such as the user exists in the predetermined region 800, the sensor 400 senses the object and transmits the sensing signal to the driver and the control box 500.

The driver 300 controls to open the entrance by moving the plurality of transparent display modules 200 in response to the sensing signal.

In an embodiment, as shown in FIG. 7*b*, the plurality of transparent displays may be composed of a first transparent display module that may be accommodated in a first side frame and a second transparent display module that may be accommodated in a second side frame. The first transparent display module and the second transparent display module are slid in opposite directions and are respectively inserted into the first side casing and the second side casing.

During the sliding driving, the control box 500 may control to output second video data 207 different from the first video data on the plurality of transparent display modules 200. That is, the control box 500 may transmit the second video data different from the first video data to the plurality of transparent display modules 200.

Based on the sliding driving, the entrance may be opened, and the user may enter an indoor space through the entrance.

In an embodiment, the driver may control the plurality of transparent display modules 200 to close the entrance after a predetermined time elapses after the plurality of transparent display modules 200 are all inserted into the automatic door casing. The plurality of control boxes 500 may transmit third video data to the plurality of transparent display modules 200 while the plurality of transparent display modules 200 close the entrance.

As shown in FIG. 7c, when the predetermined time has elapsed and no object is sensed in the predetermined region 800, the plurality of transparent display modules 200 may be driven to slide in a direction opposite to the direction of being inserted into the automatic door casing, thereby closing the entrance.

During the sliding driving, the control box 500 may control to output the third video data different from the second video data on the plurality of transparent display modules 200.

That is, the control box 500 may transmit the third video data different from the second video data to the plurality of transparent display modules 200.

Accordingly, the user may access various visual information through different images output on the plurality of display modules based on the opening and the closing of the entrance.

In order to provide continuous visual information to the user, image information should be stably output on the plurality of transparent display modules 200. Accordingly, stable video data input and output between the plurality of transparent display modules 200 and the control box 500 is required, and a structure that is easy for the user to access to the control box 500 is required to easy maintenance thereof.

In an embodiment according to the present disclosure, a first maintenance door 131 disposed on a face of a portion of the first side casing 121 and a second maintenance door 132 disposed on a face of a portion of the second side casing 122 are included. The first maintenance door 131 and the second maintenance door 132 may be formed to be opened and closed to allow the user to access an interior of the side casing.

Figure 8:
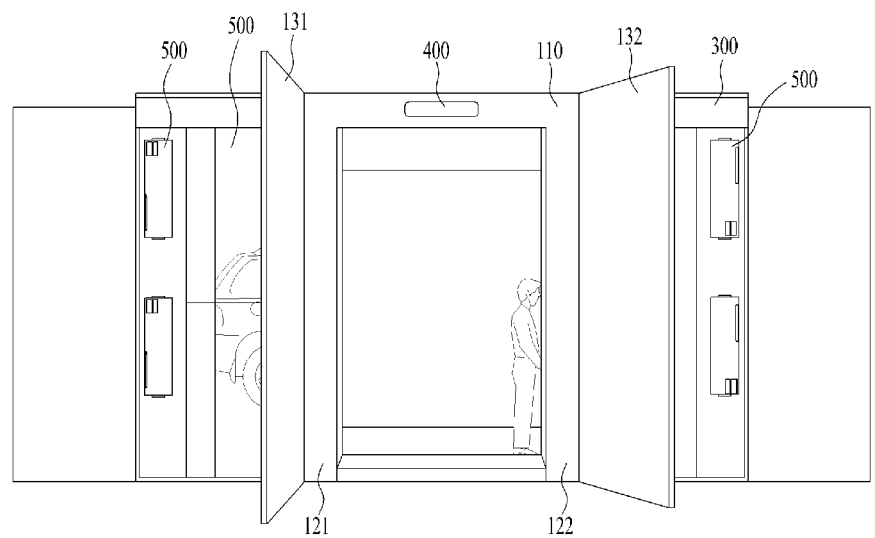
FIG. 8 is a perspective view illustrating a state in which maintenance doors according to an embodiment of the present disclosure are opened.

As shown in FIG. 8, a plurality of maintenance doors may be arranged on faces of portions of the side casings. A hinge may be disposed at one side of the maintenance door to open and close the maintenance door in response to a need of the user.

First, when the first maintenance door 131 is opened, the driver 300 disposed in the first side casing 121, the first transparent display module 210, and the control box 500 connected to the first transparent display module 210 may be accessed.

Likewise, when the second maintenance door 132 is opened, the driver 300 disposed in the second side casing, the second transparent display module, and the control box 500 connected to the second transparent display module may be accessed.

Accordingly, the user may open the plurality of maintenance doors to stop the automatic door system and easily perform maintenance of the automatic door system.

Figure 9A:
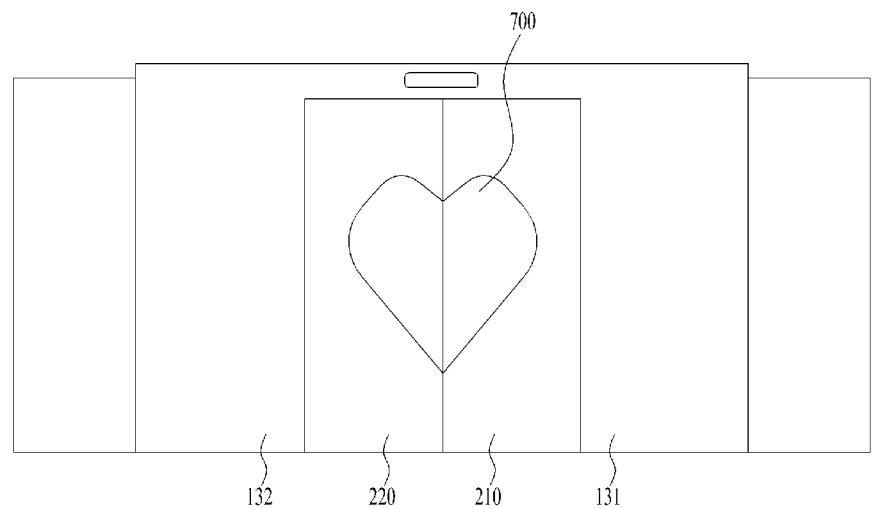
FIGS. 9a to 9c are conceptual diagrams illustrating image output of transparent display modules based on whether maintenance doors according to an embodiment of the present disclosure are opened.
Figure 9B:
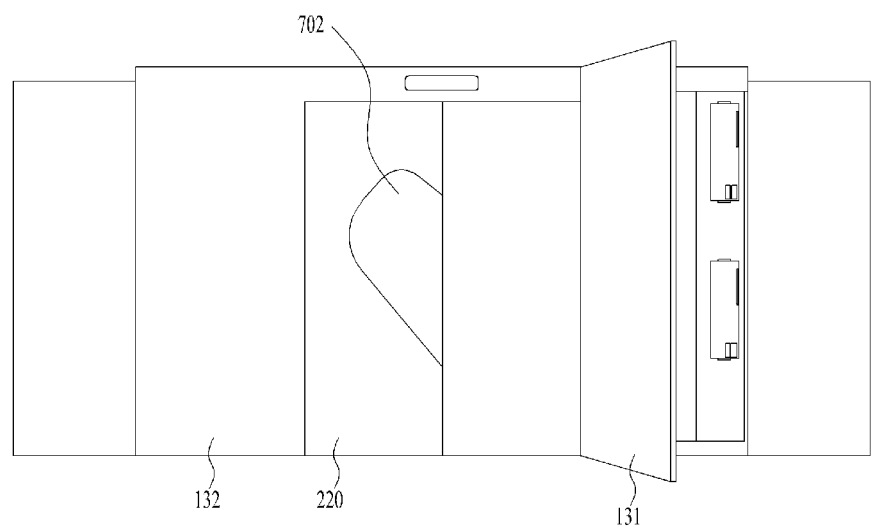
Figure 9C:
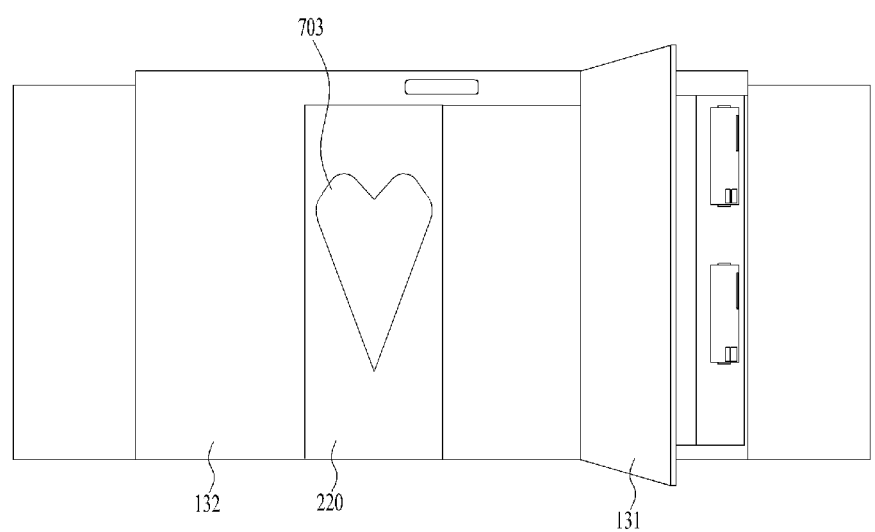

FIGS. 9a to 9c are conceptual diagrams illustrating image output of transparent display modules based on whether maintenance doors according to an embodiment of the present disclosure are opened.

As shown in FIG. 9a, in a state in which both of the first and second maintenance doors 131 and 132 are closed, the automatic door system according to the present disclosure operates normally. Information of an entire image 700 may be output on the plurality of transparent display modules 210 and 220.

In an embodiment, the plurality of transparent display modules 210 and 220 may divide the information of the entire image 700 into first image information and second image information and output the first image information and the second image information.

The first image information and the second image information are naturally connected to each other on the plurality of display modules to be recognized by the user as a single image connected as a whole.

As indicated with an embodiment in FIG. 9a, the entire image information may be an image content representing a heart shape. The entire image information may be divided again into the first image information representing only one half of the heart shape and the second image information representing the other half, and each of the first and second image information may be output on each transparent display modules.

In an embodiment, when a total of 4 transparent display modules are used, the first image may be divided again into a 1-1 image and a 1-2 image, and the 1-1 image and the 1-2 image may be output on a first upper transparent display module and a first lower transparent display module, respectively. Likewise, the second image may be divided into a 2-1 image and a 2-2 image, and the 2-1 image and the 2-2 image may be output on a second upper transparent display module and a second lower transparent display module, respectively.

Accordingly, the user located in the predetermined region in front of the automatic door system may recognize the image information respectively output from the first upper and lower and the second upper and lower transparent display modules as one unified image information as a whole.

When a problem occurs in some of the transparent display modules during the operation of the automatic door system, the user may open a maintenance door on a side where the problem has occurred and check the transparent display modules and the control boxes.

As shown in FIG. 9b, in an embodiment of the present disclosure, when the first maintenance door 131 is opened, the driver may stop the driving of the first transparent display module, and the video data output of the first transparent display module may be stopped.

In addition, at the same time, the second image that has been being output may be continuously output on the second transparent display module.

In an embodiment, for safe system operation, when the first maintenance door is opened, the first transparent display module may be manually inserted into the automatic door casing or exposed to the outside by the user.

Accordingly, the user may stop some components of the automatic door system by opening the maintenance door and check the system safely.

In one example, when it is necessary to stop some components of the automatic door system for a long time, it is necessary to drive the system only with the remaining components except for the stopped components.

In an embodiment, the system implementing the automatic door according to the present disclosure may control the image information output on the plurality of transparent display modules 200 in response to an opening time of the maintenance door.

As shown in FIG. 9c, in an embodiment of the present disclosure, when a certain time elapses from a time point at which the first maintenance door 131 is opened, the second transparent display module may output a third image 703 instead of outputting the second image.

In an embodiment, the third image 703 may be the same content as the entire image described above. That is, the third image 703 is the same as the content represented in the entire image, but because a screen size is changed, a process of scaling a resolution is required.

As shown in FIG. 9c, the third image 703 may be a heart-shaped content 703, the same as the heart-shaped content represented by the entire image.

In an embodiment, when outputting the same content as the entire image on the second display module, because an area capable of representing the content is narrower than that in a case in which all of the plurality of display modules simultaneously output the images, a resolution of the second display module may be changed.

In an embodiment, the resolution change may be performed such that the content is represented to be longer in a height direction of the automatic door than the content that has been output in the entire image.

Accordingly, even when a problem occurs in either transparent display module and the image information output is impossible, the same content as the entire image 700 may be output on the remaining transparent display module to similarly provide visual information necessary to the user.

In other words, the automatic door system described above may be a system in which, when all of the maintenance doors are closed, the first transparent display module 210 outputs the first image, the second transparent display module 220 outputs the second image, the first transparent display module 210 stops outputting the first image and the second transparent display module 220 outputs the second image until the predetermined time elapses after the first maintenance door 131 is opened, and the second transparent display module 220 outputs the third image 703 when the predetermined time elapses after the first maintenance door 131 is opened. In this case, the third image 703 has the same content as the entire image 700, but is designed such that the resolution and the size thereof are automatically changed.

When the problem of the transparent display module is solved and the transparent display module is able to be operated normally again before the predetermined time elapses, the maintenance door may be closed and the information of the first image and the second image 702 may be controlled to be continuously output on the first transparent display module and the second transparent display module 220, respectively.

The predetermined time may be a time previously input by the user, and may be changed in response to a need of the user.

In an embodiment, the plurality of transparent display modules further include a touch panel that may receive a touch input by the user. When the touch input through the touch panel of the user is sensed, the driver may control at least one of the plurality of transparent display modules to be inserted into the automatic door casing.

Accordingly, without the sensing signal by the sensor, the user may control an opening operation of the automatic door based on the automatic door system.

According to the above embodiment, there is also a technical effect of increasing an energy efficiency of the automatic door system by preventing an indiscriminate sensing operation and allowing only necessary personnel to enter and exit.

Figure 10:
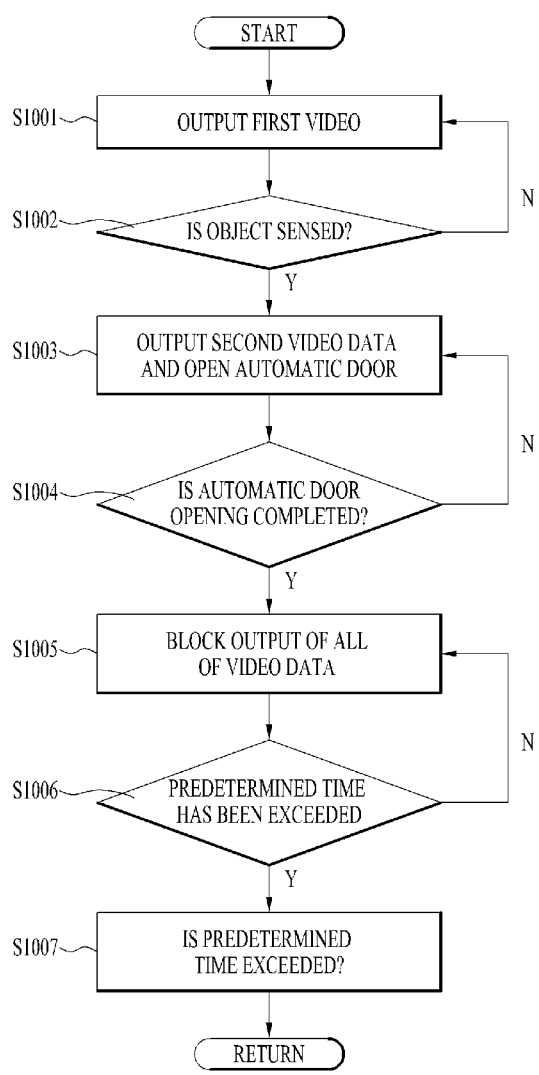
FIG. 10 is a block diagram illustrating a method for controlling an automatic door system according to an embodiment of the present disclosure.

FIG. 10 is a block diagram illustrating a method for controlling an automatic door system according to an embodiment of the present disclosure.

First, a standby state in which the entrance is closed with the plurality of transparent display modules of the system for implementing the automatic door using the transparent display is assumed. In the standby state, the first video data is output on the transparent display module (S1001).

It is determined whether the object is sensed in the predetermined region near the transparent display automatic door by the sensor (S1002).

When the object is sensed as a result of the determination, the transparent display module outputs the second video data and the automatic door is opened (S1003).

More specifically, for example, the driver may drive the plurality of transparent display modules to slide to be inserted into the automatic door frame.

It is determined whether the automatic door opening by the driver is completed (S1004).

When the automatic door opening is completed as a result of the determination, the control box stops the transmission of all of the video data to the transparent display module. Accordingly, the output of all of the video data of the transparent display module is blocked (S1005).

After the insertion of the plurality of transparent displays is completed by the driver and the opening of the entrance is completed, it is determined whether the predetermined time has been exceeded (S1006).

When the predetermined time is exceeded as a result of the determination, the driver drives the plurality of transparent displays in an opposite direction to close the entrance.

At the same time, the control box transmits the third video data to the plurality of transparent display modules (S1007).

Accordingly, the transparent display module may perform the driving of closing the entrance in the state in which the third video data is output.

When the driving of closing the entrance is completed, the plurality of transparent display modules 200 return to the standby state again.

Figure 11:
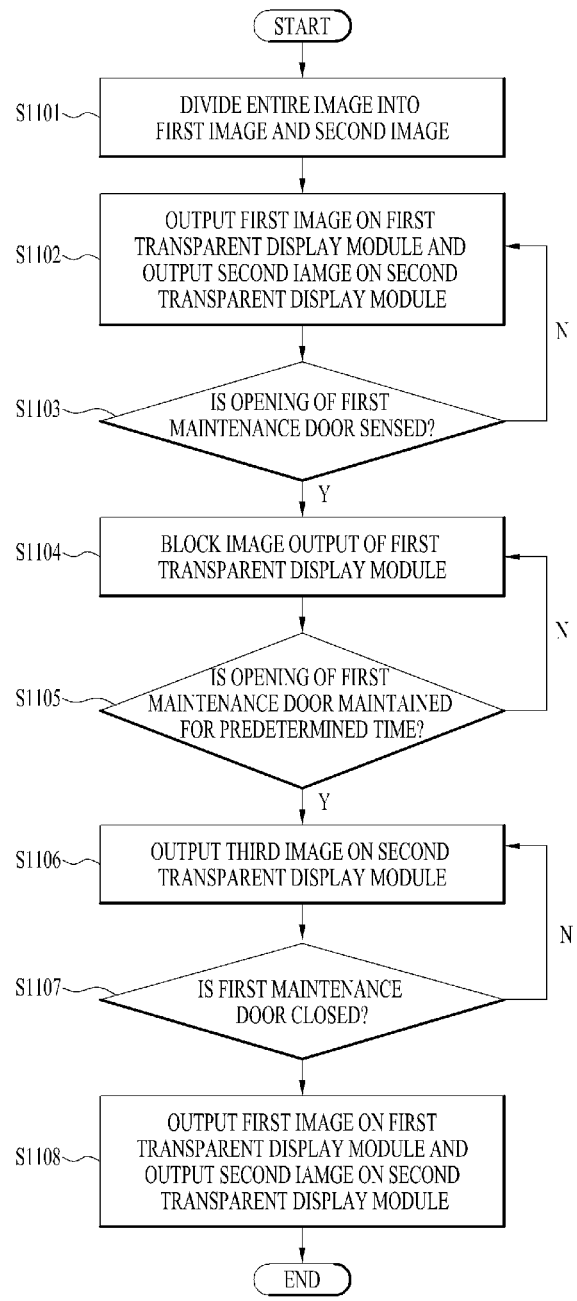
FIG. 11 is a block diagram illustrating a method for controlling an automatic door system according to another embodiment of the present disclosure.

FIG. 11 is a block diagram illustrating a method for controlling an automatic door system according to another embodiment of the present disclosure.

In an embodiment, the plurality of transparent display modules may include the first transparent display module and the second transparent display module. Accordingly, the control box connected to the plurality of transparent display modules may divide the entire image into the first image and the second image (S1101), and output the first image and the second image on the first transparent display module and the second transparent display module, respectively (S1102).

When the problem occurs in the first transparent display module while the plurality of transparent displays are driving, the user may open the first maintenance door disposed on the automatic door casing and access the first transparent display module and the control box connected to the first transparent display module.

When it is sensed that the first maintenance door is opened (S1103), the control box stops transmitting the image information to the first transparent display module. Accordingly, the image output of the first transparent display module is blocked (S1104).

In addition, at the same time, the sliding driving of the first transparent display module may be stopped.

Accordingly, in the state in which the driving is stopped, the user may safely solve the problem that has occurred in the first transparent display module and perform the maintenance of the entire automatic door system.

When the opening of the first maintenance door is maintained for the predetermined time (S1105), the third image instead of the second image may be output on the second transparent display module (S1106).

Accordingly, even when the problem occurs in the first transparent display module, the automatic door system may be partially operated by outputting the same content as the entire image through the second transparent display module that is normally driven.

When the first maintenance door 131 is closed after solving all the problems that had occurred in the first transparent display module (S1107), the first image is output on the first transparent display module again, and the second image is output on the second transparent display module, so that one entire image formed by connecting the first image and the second image with each other may be output on all of the plurality of transparent display modules (S1108).

In one example, as described earlier, the present disclosure, unlike the prior art, provides various contents by attaching the transparent display to the automatic door that is opened and closed. Therefore, in order to apply the present disclosure, the cable box and the transparent display must be connected to each other with various cables. As a result of testing during a manufacturing process, a problem was found that the cable connected to the cable box or the transparent display frequently falls.

Another embodiment of the present disclosure for solving such a problem will be described later in detail with reference to FIGS. 12 to 15.

Figure 12:
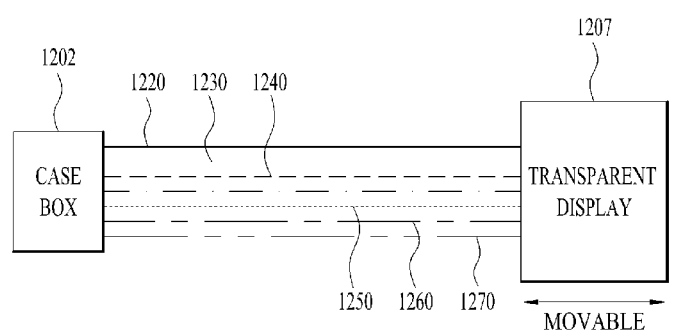
FIG. 12 is a diagram illustrating a plurality of various cables used to connect a cable box and a transparent display with each other in an automatic door system according to another embodiment of the present disclosure.

FIG. 12 is a diagram illustrating a plurality of various cables used to connect a cable box and a transparent display with each other in an automatic door system according to another embodiment of the present disclosure.

As shown in FIG. 12, a case box 1202 and a transparent display 1207 are connected to each other with two harness cables 1220 and 1230 and four micro coaxial (MCX) cables 1240, 1250, 1260, and 1270.

In this connection, the MCX cables 1240, 1250, 1260, and 1270 are used to transmit an image signal, which may be referred to as cables of a first type in this specification.

In one example, the harness cables 1220 and 1230 are used for power supply, which may be referred to as cables of a second type in this specification.

It is also possible to consider making a spacing between the cables wide enough, but because of a limited size of the cable box and a limited size of the transparent display, it is impossible to increase the spacing between the cables indefinitely.

In addition, it is also possible to consider designing a length of each cable to be long, but it was not possible to solve a problem that the cables twist frequently in the process in which the transparent display 1207 is frequently opened and closed as the automatic door.

Figure 13:
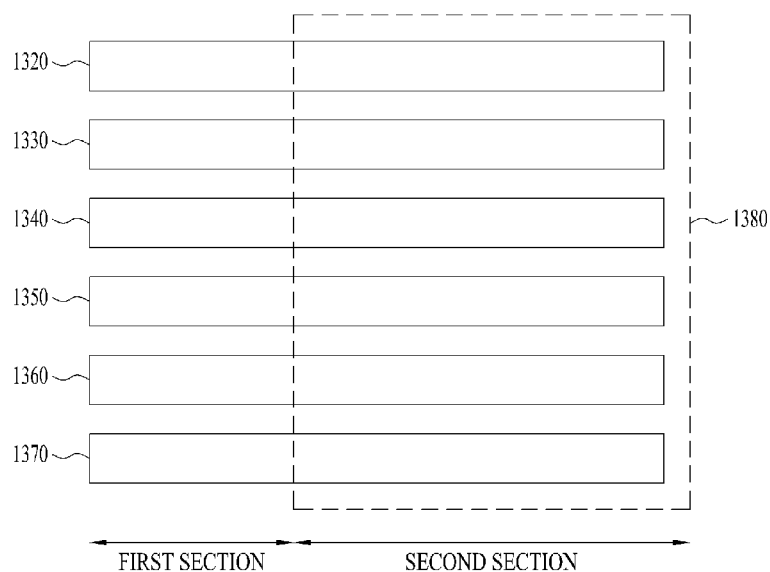
FIG. 13 is a diagram for describing a process of surrounding a plurality of cables illustrated in FIG. 12 with a guide rail only in necessary a section.

FIG. 13 is a diagram for describing a process of surrounding a plurality of cables illustrated in FIG. 12 with a guide rail only in necessary a section.

In order to solve the problem of the twisting of the cables resulted from the frequent movement of the transparent display 1207 mentioned in FIG. 12, a guide rail 1380 is designed to surround a plurality of cables 1320, 1330, 1340, 1350, 1360, and 1370 as shown in FIG. 12. In this connection, various materials such as plastic, synthetic resin, rubber, or the like may be used as the guide rail, and the scope of the present disclosure is not limited thereto.

However, surrounding of all portions of the cables that connect the cable box and the transparent display with each other with the guide rail may have some disadvantages in terms of cost.

Therefore, a technical idea for solving the problem of the cable twisting and at the same time using only a minimum guide rail is needed. Thus, as shown in FIG. 13, designing by dividing the cables into a second section in which the guide rail surrounds the cables and a first section that does not require the guide rail is a part where another technical effect of the present disclosure is expected. A length of the cables illustrated in FIG. 13 is about 3 m. The guide rail is applied only to the second section to control the movement with an optimum length, and is not applied to the remaining section, which is the first section. The guide rail is designed such that a movement thereof in the second section is not interfered.

A more detailed description will be described later in detail with reference to FIG. 14.

Figure 14:
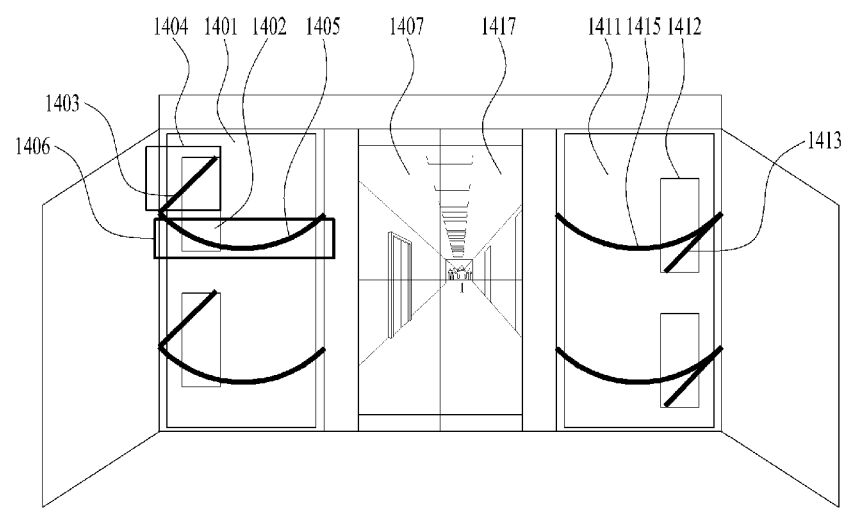
FIG. 14 illustrates an entire system including cables surrounded by a guide rail only in a certain section.

FIG. 14 illustrates an entire system including cables surrounded by a guide rail only in a certain section. FIG. 14 is a diagram that assumes a state in which the automatic door including the transparent display is closed, unlike FIG. 15 to be described later.

A system for implementing an automatic door using a plurality of transparent displays, as shown in FIG. 14, includes a first control box 1402 attached to a first side casing 1401 and a second control box 1412 attached to a second side casing 1411.

Cables of the first type and the second type 1403 described above in FIG. 12 are connected to each other in a first section 1404 from a top face of the first control box 1402 to a left face of the first side casing 1401.

In addition, cables of the first type and the second type 1405 are connected to each other in a second section 1406 from the left face of the first side casing 1401 to a left face of the movable first transparent display 1407.

In particular, the cables 1405 are surrounded by the guide rail only in the second section 1406, whereas all the cables 1403 are exposed in the first section 1404 and are not surrounded by the guide rail. This is because there is a high possibility that the cables are twisted resulted from a movement of the first transparent display 1407 only in the second section 1406. On the other hand, there is almost no possibility of the cables being twisted resulted from the movement of the first transparent display 1407 in the first section 1404, which is considered in the design of FIG. 14.

In one example, it may be seen that the second control box 1412 attached to the second side casing 1411 is located in a region inverted by 180 degrees from a location of the first control box 1402 attached to the first side casing 1401, as shown in FIG. 14. Therefore, there is an advantage that it is not necessary to separately manufacture a side casing for a left side and a side casing for a right side, and one side casing is able to be used by being inverted 180 degrees after being designed.

In addition, power and interface jacks (e.g., the HDMI, the DP, a LAN, and the like) of the control box (which may also be referred to as a signage box) are arranged to be connectable to an outer frame on each of both left and right sides. The reason for such design is to minimize interference resulted from the movement of the automatic door by arranging the cable with the shortest distance when the interface jack or a power casing is connected to the outside.

In one example, as shown on a right side of FIG. 14, cables of the first type and the second type 1413 are connected to each other in a third section (not shown) from a bottom face of the second control box 1412 to a right face of the second side casing 1411.

Further, cables of the first type and the second type 1415 are connected to each other in a fourth section (not shown)

from the right side of the second side casing 1411 to a right face of the movable second transparent display 1417.

In the third section (not shown), similarly to the first section 1404 described previously, the cables are exposed without the guide rail. On the other hand, in the fourth section (not shown), similarly to the second section 1406 described previously, the cables are surrounded by the guide rail, so that a problem in which the cables are twisted as the second transparent display 1417 moves may be solved.

Figure 15:
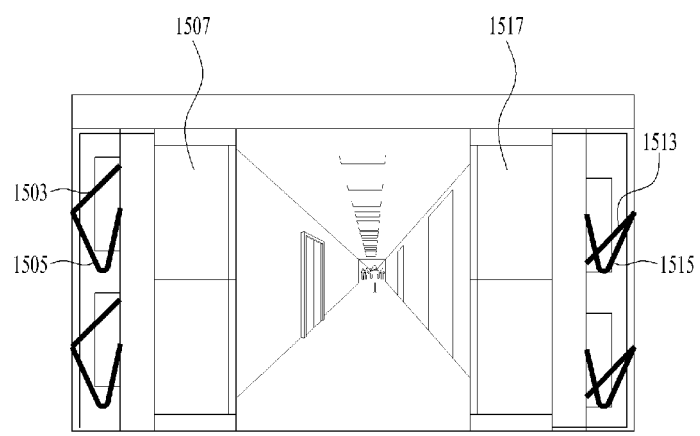
FIG. 15 illustrates an opened state of an automatic door including a transparent display unlike FIG. 14.

In addition, FIG. 15 illustrates an opened state of an automatic door including a transparent display unlike FIG. 14. Even when a redundant description is omitted, those skilled in the art may supplementarily interpret FIG. 15 with reference to FIG. 14.

In a state in which an automatic door including a first transparent display 1507 is open, the problem in which the cables are twisted does not occur on cables 1505 surrounded by the guide rail. In addition, it has been experimentally identified that although cables 1503 in another section are not surrounded by the guide rail, the cables are not twisted because both the cable box and the side casing are fixed.

Likewise, in a state in which an automatic door including a second transparent display 1517 is open, the problem in which the cables are twisted does not occur on cables 1515 surrounded by the guide rail. In addition, although cables 1513 in another section are not surrounded by the guide rail, the cables are not twisted because both the cable box and the side casing are fixed.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments.

The scope of the present disclosure should be construed as being covered by the scope of the appended claims, and all technical ideas falling within the scope of the claims should be construed as being included in the scope of the present disclosure.

What is claimed is:

1. A system for implementing an automatic door using a transparent display, the system comprising:
    an automatic door casing disposed around an entrance;
    a plurality of transparent display modules configured to be inserted into the automatic door casing or exposed to the outside to open and close the entrance;
    a sensor installed within a predetermined distance from the plurality of transparent display modules, wherein the sensor is configured to sense an object;
    a driver configured to control at least one of the plurality of transparent display modules to be inserted into the automatic door casing or exposed to the outside based on a sensing result of the sensor;
    a door frame connected to the driver, wherein the door frame supports the plurality of transparent display modules; and
    a plurality of control boxes configured to respectively transmit different video data to the plurality of transparent display modules based on the sensing result of the sensor,
    wherein the automatic door casing includes:
    an upper casing formed across a top face of the entrance;
    a first side casing formed along a wall face at one side of the entrance; and
    a second side casing formed along the wall face at the other side of the entrance,
    wherein the plurality of transparent display modules include:
    a first transparent display module configured to be inserted into the first side casing or exposed to the outside; and
    a second transparent display module configured to be inserted into the second side casing or exposed to the outside,
    wherein the first transparent display module and the second transparent display module come into contact with each other to close the entrance,
    wherein the system further comprises:
    a first maintenance door disposed on a face of a portion of the first side casing; and
    a second maintenance door disposed on a face of a portion of the second side casing,
    wherein the first maintenance door and the second maintenance door are opened and closed, so that a user is able to access an interior of the automatic door casing.

2. The system of claim 1,
    wherein the first side casing and the second side casing are made of an opaque material.

3. The system of claim 1, wherein the first transparent display module and the second transparent display module further include a shock mitigating member disposed at a portion where the first transparent display module and the second transparent display module are in contact with each other.

4. The system of claim 1, wherein each of the first transparent display module and the second transparent display module includes two transparent display panels vertically connected to each other,
    wherein the door frame further includes an auxiliary frame disposed between the two transparent display panels to support the two transparent display panels.

5. The system of claim 1, wherein the sensor is attached to the upper casing, wherein the sensor is configured to sense the object in a predetermined region in front of a front face of the at least one of the plurality of transparent display modules and transmit a sensing signal to the driver.

6. The system of claim 5, wherein the plurality of control boxes are configured to:
    transmit first video data to the plurality of transparent display modules in a state where the entrance is closed by the plurality of transparent display modules;
    transmit second video data to the plurality of transparent display modules based on the object being sensed by the sensor; and
    block the video data transmission in a state where all of the plurality of transparent display modules are inserted into the automatic door casing.

7. The system of claim 5, wherein the driver is configured to control the plurality of transparent display modules to close the entrance based on a predetermined time elapsing after all of the plurality of transparent display modules are inserted into the automatic door casing,
    wherein the plurality of control boxes are configured to transmit third video data to the plurality of transparent display modules while the plurality of transparent display modules close the entrance.

8. The system of claim 1, wherein the driver is configured to stop driving of the first transparent display module and video data output of the first transparent display module is stopped based on the first maintenance door being open.

9. The system of claim 1, wherein the plurality of transparent display modules are configured to divide an entire image into a first image and a second image and output the first image and the second image,
   wherein the first transparent display module is configured to output the first image and the second transparent display module is configured to output the second image based on all the maintenance doors being closed,
   wherein the first transparent display module is configured to stop outputting the first image and the second transparent display module is configured to output the second image until a predetermined time elapses after the first maintenance door is opened,
   wherein the second transparent display module is configured to output a third image based on the predetermined time elapsing after the first maintenance door is opened, and
   wherein the third image is an image representing the same content as the entire image.

10. The system of claim 1, further comprising a tempered glass attached to at least a portion of a front face or a rear face of the at least one of the plurality of transparent display modules,
   wherein a thickness of the tempered glass is equal to or less than 3 mm.

11. The system of claim 1, wherein the plurality of transparent display modules further include a touch panel configured to receive a touch input from a user,
   wherein the driver is configured to control the at least one of the plurality of transparent display modules to be inserted into the automatic door casing based on the touch input through the touch panel from the user being sensed.

* * * * *